United States Patent
Karacali-Akyamac et al.

(10) Patent No.: US 7,720,005 B2
(45) Date of Patent: May 18, 2010

(54) ESTIMATING NETWORK-LAYER TOPOLOGY USING END-TO-END MEASUREMENTS

(75) Inventors: Bengi Karacali-Akyamac, Bridgewater, NJ (US); Mark John Karol, Fair Haven, NJ (US)

(73) Assignee: Avaya Inc., Basking Ridge, NJ (US)

( * ) Notice: Subject to any disclaimer, the term of this patent is extended or adjusted under 35 U.S.C. 154(b) by 208 days.

(21) Appl. No.: 11/939,297

(22) Filed: Nov. 13, 2007

(65) Prior Publication Data

US 2009/0122720 A1 May 14, 2009

(51) Int. Cl.
*H04L 12/26* (2006.01)
(52) U.S. Cl. ...................................... 370/254
(58) Field of Classification Search ........................ None
See application file for complete search history.

(56) References Cited

U.S. PATENT DOCUMENTS

| | | | | |
|---|---|---|---|---|
| 6,256,295 | B1 * | 7/2001 | Callon | 370/254 |
| 6,904,020 | B1 * | 6/2005 | Love et al. | 370/252 |
| 6,947,392 | B2 * | 9/2005 | Novaes | 370/256 |
| 7,289,225 | B2 * | 10/2007 | De Groot | 356/497 |
| 7,567,523 | B2 * | 7/2009 | Black et al. | 370/255 |
| 2002/0051464 | A1 * | 5/2002 | Sin et al. | 370/466 |
| 2006/0120396 | A1 * | 6/2006 | Hasegawa et al. | 370/432 |

OTHER PUBLICATIONS

Rabbat, Michael G., "Multiple-Source Internet Tomography", Dec. 2006, IEE Journal on selected areas in communication, vol. 24, No. 12, pp. 2231-2232.*

Rabbat, Michael G., "Multiple-Source Internet Tomography", Dec. 2006, IEE Journal on selected areas in communications, vol. 24 No. 12, pp. 2221-2227.*

Coates, Mark et. al., "Maximum Likelihood Network Topology Identification from Edge-based Unicast Measurements", "XP002522849 ACM Sigmetrics Performance Evaluation Review (Online) http://doi.acm.org/10.1145/511399.511337 [retrieved on Apr. 5, 2009]", Jun. 15, 2002, pp. 11-20, vol. 30, No. 1, Published in: US.

Rabbat, Michael G., et. al., "Multiple-Source Internet Tomography", "XP011151085 IEEE Journal on Selected Areas in Communications", Dec. 1, 2006, pp. 22212234, vol. 24, No. 12, Publisher: IEEE Service Center, Piscataway, NJ, Published in: US.

(Continued)

*Primary Examiner*—Chirag G Shah
*Assistant Examiner*—Steve Young
(74) *Attorney, Agent, or Firm*—DeMont & Breyer, LLC (57) ABSTRACT

A method for estimating the network-layer topology of a telecommunications network is described. In particular, the illustrative embodiment of the present invention estimates the existence and connectivity of nodes in the topology based on the detection of network-wide end-to-end path intersections. This is based on the assumption that pairs of streams of packets that share a common node will interfere and that the interference can be detected in the received streams. In general, this interference is manifested as jitter. By transmitting streams on each pair of end-to-end paths in the network, and detecting interference (or a lack of interference) a matrix of path intersections for the network can be created. Using logic and supposition, the topology of the network can be estimated using the matrix of path intersections. Once the estimate of the topology is complete, the maintenance and operation of the network can proceed based on the topology.

6 Claims, 7 Drawing Sheets

OTHER PUBLICATIONS

Karacali, Bengi et. al., "Network-Wide Inference of End-to-End Path Intersections", "XP031290515 Network Operations and Management Symposium 2008", Apr. 7, 2008, pp. 168-175, Publisher: IEEE, Published in: US.

Lupia, Sergio, "EP Application No. 08168860.8 Extended Search Report Apr. 22, 2009",, Publisher: EPO, Published in: EP.

F. Lo Presti, et al, Multicast-Based Inference of Network-Internal Delay Distributions, This work was sponsored in part by the DARPA and the Air Force Research Laboratory under agreement F30602-98-2-0238, May 14, 2001.

N.G. Duffield, et al, Network Delay Tomography from End-to-end Unicast Measurements, This work was supported in part by DARPA and the AFL under agreement F30602-98-2-0238.

Nick Duffield, et al, Network Loss Tomography Using Striped Unicast Probes, This work was supported in part by DARPA and the AFL under agreement F30602-98-2-0238.

Dina Katabi, et al, A Passive Approach for Detecting Shared Bottlenecks, MIT Laboratory for Computer Science.

Dina Katabi, et al, Inferring Congestion Sharing and Path Characteristics from Packet Interarrival Times, D. Katabi was supported by ARPA Agreement J958100, under contract F30602-00-20553, C. Blake was supported under DARPA contract N66001-00-1-8933.

Min Sik Kim, et al, A Wavelet-Based Approach to Detect Shared Congestion, Research sponsored by National Science Foundation ANI-0319168 and Texas Advances Research Program 003658-0439-2001.

Mark Coates, et al, Merging Logical Topologies Using End-to-end Measurements, IMC '03, Oct. 27-29, 2003, Miami Beach, Florida, USA.

Michael G. Rabbat, et al, Multiple Source Internet Tomography, This research was supported by the NSERC AAPN Research Network, and by Applied Signal Technology, Inc., Portions of this work were presented at the ACM Internet Measurement Conference, 2003 [1], and at IEEE Infocom, 2004 [2].

Sylvia Ratnasamy, et al, Inference of Multicast Routing Trees and Bottleneck Bandwidths using End-to-end Measurements.

Dan Rubenstein, et al, Detecting Shared Congestion of Flows Via End-to-end Measurement, IEEE Transactions on Networking, vol. XX, No. YY, Month 2002.

Khaled Harfoush, et al, Robust Identification of Shared Losses Using End-to-End Unicast Probes, This work was partially supported by NSF research grants CCR-9706685 and ANI-9986397.

Lili Want, et al, Passive Inference of Path Correlation, This work supported in part by NSF Grants EIA-0101242 and ANI-0121438.

Ossama Younis, et al, Flow Mate: Scalable On-line Flow Clustering.

Young, Steve R., "U.S. Appl. No. 11/939,293 Office Action Aug. 21, 2009",, Publisher: USPTO, Published in: US.

Young, Steve R., "U.S. Appl. No. 11/939,295 Office Action Oct. 6, 2009",, Publisher: USPTO, Published in: US.

Lupia, S., "EP Application No. 08168860.8-2416 Examination Report Jul. 17, 2009",, Publisher: EPO, Published in: EP.

Young, Steve R., "U.S. Appl. No. 11/939,293 Notice of Allowance Jan. 13, 2010", Publisher: USPTO, Published in: US.

* cited by examiner

ESTIMATING NETWORK-LAYER TOPOLOGY USING END-TO-END MEASUREMENTS

FIELD OF THE INVENTION

The present invention relates to telecommunications in general, and, more particularly, to the maintenance and operation of telecommunications networks.

BACKGROUND OF THE INVENTION

There are many situations in the maintenance and operation of a telecommunications network when it is useful to know the logical or network-layer topology of the network. In some cases, the network-layer topology of the network is known from those who constructed it, and in some other cases the network infrastructure can provide or determine the topology. In other cases, however, the network-layer topology is not known and must be estimated based on end-to-end measurements without the support of the network infrastructure. There are techniques in the prior art that attempt to do this, but they all exhibit limitations and disadvantages. Therefore, the need exists for a new method of estimating the network-layer topology of a network using end-to-end measurements.

SUMMARY OF THE INVENTION

The present invention provides a method for estimating the network-layer topology of a telecommunications network without some of the costs and disadvantages for doing so in the prior art. For example, the illustrative embodiment of the present invention estimates the existence and connectivity of nodes in the network based on the interference of streams of packets that traverse the network. When two streams of packets traverse two end-to-end paths in the network and one stream causes jitter in the other, it can be deduced that the two paths share a common node.

In accordance with the illustrative embodiment, each pair of streams is transmitted with a particular temporal pattern. The pattern of one stream—the interference stream—is designed to induce jitter in the streams with which it shares a network node (e.g., a queue, a processor, etc.). The pattern of the interference stream is also designed to induced jitter that is distinguishable from background jitter. The pattern of the second stream—the probe stream—is designed to capture jitter caused by the interference stream in such a way that it can be readily distinguished from background jitter. By transmitting an interference stream and a probe stream on each pair of end-to-end paths in the network, all of the end-to-end path intersections for the network can be created.

Using logic and supposition, the topology of the network can be estimated using the knowledge of which end-to-end paths intersect and which do not. The topology of the network can only be estimated and not conclusively deduced because networks with different network-layer topologies can yield the same combination of end-to-end path intersections. For many applications, however, an estimated topology, even if imperfect, is useful.

DETAILED DESCRIPTION

Figure 1:
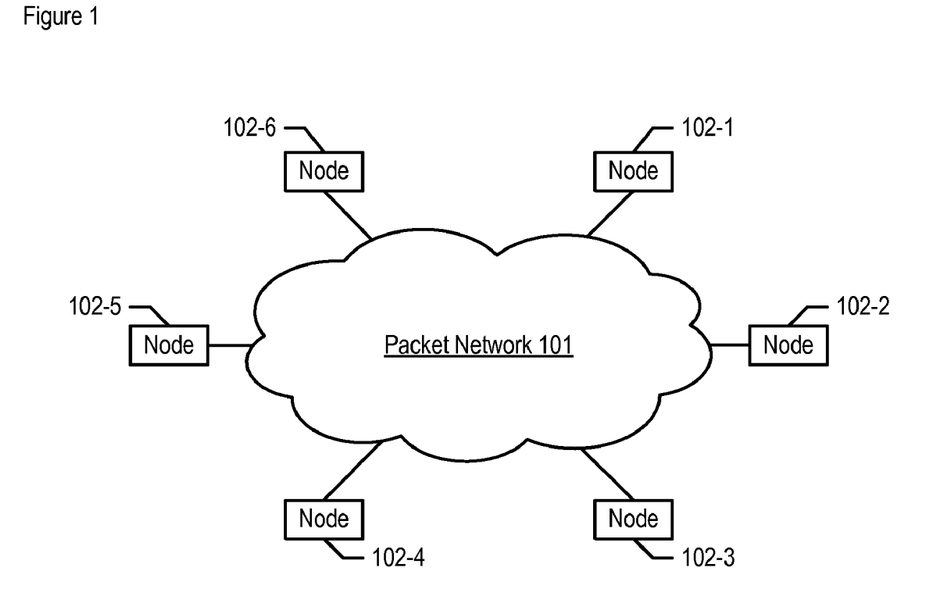
FIG. 1 depicts a schematic diagram of the illustrative embodiment of the present invention.

FIG. 1 depicts a schematic diagram of the illustrative embodiment of the present invention. The illustrative embodiment comprises: packet network 101 and six nodes 102-1 through 102-6 connected to packet network 101.

Packet network 101 comprises hardware and software, in well-known fashion, and is capable of transporting a stream of packets from any node to any other node. It will be clear to those skilled in the art how to make and use packet network 101. In accordance with the illustrative embodiment, the network-layer topology of packet network 101 is not initially known to applications on nodes 101-1 through 101-6, but is estimated using the methodology described in detail below.

Each of nodes 102-1 through 102-6 comprises hardware and software to enable it to perform the functionality described below. In accordance with the illustrative embodiment, each of nodes 102-1 through 102-6 is identical, but it will be clear to those skilled in the art, after reading this disclosure, how to make and use alternative embodiments of the present invention in which some or all of the nodes are different. Although the illustrative embodiment comprises six nodes, it will be clear to those skilled in the art, after reading this disclosure, how to make and use alternative embodiments of the present invention that comprise any number of nodes.

Figure 2:
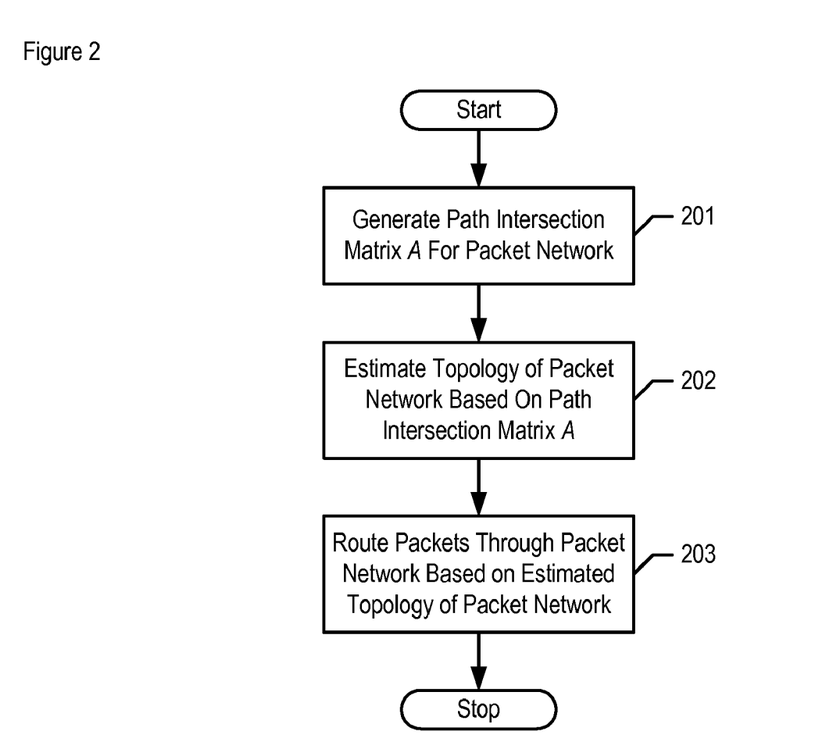
FIG. 2 depicts a flowchart of the salient tasks associated with the operation of the illustrative embodiment of the present invention.

FIG. 2 depicts a flowchart of the salient tasks associated with the operation of the illustrative embodiment of the present invention.

In task 201, the illustrative embodiment generates a path intersection matrix A for packet network 101. The path intersection matrix A represents the knowledge of which end-to-end paths in packet network 101 intersect and which do not. To populate the path intersection matrix A, the illustrative embodiment empirically tests every pair of end-to-end paths in packet network 101 to determine whether they intersect or not. The process of testing every pair of end-to-end paths in packet network 101 to determine whether they intersect or not is described in detail below and in the accompanying figures.

In accordance with the illustrative embodiment, the following notation is used. Packet network 101 is represented as a graph G=(V,E) where V is the set of nodes (routers and hosts) and E is the set of edges representing network-layer connectivity between the nodes on V. The set N ⊂ V are nodes 102-1 through 102-6. The set of directional end-to-end paths between nodes in N is represented as P. A path p is considered an end-to-end path if both of its end nodes are in N. The cardinality of P is $|P|=|N|\times(|N|-1)$. An end-to-end path from $n_i \in N$ to $n_j \in N$ is represented as $p_{i,j}$, where $p_{i,j} \in P$.

Path intersection matrix A has dimensions $|P|\times|P|$. Each element $A_{a,b,c,d}=1$ if $p_{a,b} \in P$ and $p_{c,d} \in P$ intersect at the network layer, and $A_{a,b,c,d}=0$ otherwise. The populated path intersection matrix A for packet network 101 is depicted in Table 1.

TABLE 1

Path Intersection Matrix A for Packet Network 101

|  | $p_{1,2}$ | $p_{1,3}$ | ... | $p_{6,4}$ | $p_{6,5}$ |
|---|---|---|---|---|---|
| $p_{1,2}$ | 1 | 1 | ... | 0 | 0 |
| $p_{1,3}$ | 1 | 1 | ... | 0 | 0 |
| ... | ... | ... | ... | ... | ... |
| $p_{6,4}$ | 0 | 0 | ... | 1 | 1 |
| $p_{6,5}$ | 0 | 0 | ... | 0 | 1 |

Although the illustrative embodiment empirically tests every pair of end-to-end paths in packet network 101 to determine whether they intersect or not, it will be clear to those skilled in the art, after reading this disclosure, how to make and use alternative embodiments of the present invention which empirically tests fewer than every pair of end-to-end paths in packet network 101.

In task 202, the illustrative embodiment estimates the topology of packet network 101 based on the path intersection matrix A generated in task 201. The topology of packet network 101 can only be estimated and not conclusively deduced because multiple networks with different, albeit similar, topologies can yield the same path intersection matrix. For many applications, however, an estimated topology, even if imperfect, is useful. It will be clear to those skilled in the art what applications require perfect knowledge of the topology and what applications can function satisfactorily with imperfect knowledge. Task 202 is described in detail below and in the accompanying figures.

In task 203, the illustrative embodiment transmits one or more packets through packet network 101 and directs those packets to be re-directed to or away from one or more specific nodes based on the topology as estimated in task 202. As is well known to those skilled in the art, an estimate of the topology of packet network 101 is useful for many applications including, but not limited to:
 i. transmitting one or more packets to transit specific nodes and to avoid specific nodes for the purposes of fault avoidance, and
 ii. transmitting redundant one or more packets to transit alternative paths and nodes, and
 iii. transmitting one or more packets to transit nodes that are "closer" than other nodes.

Figure 8:
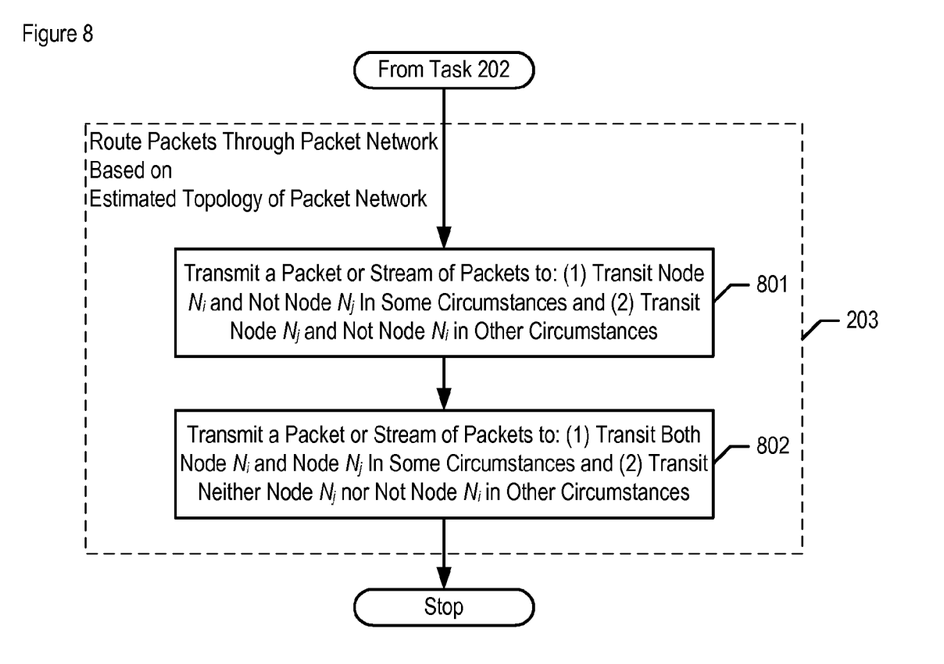
FIG. 8 depicts a flowchart of the salient tasks associated with the operation of task 203.

Task 203 is described in detail below and in the accompanying figure.

Figure 3:
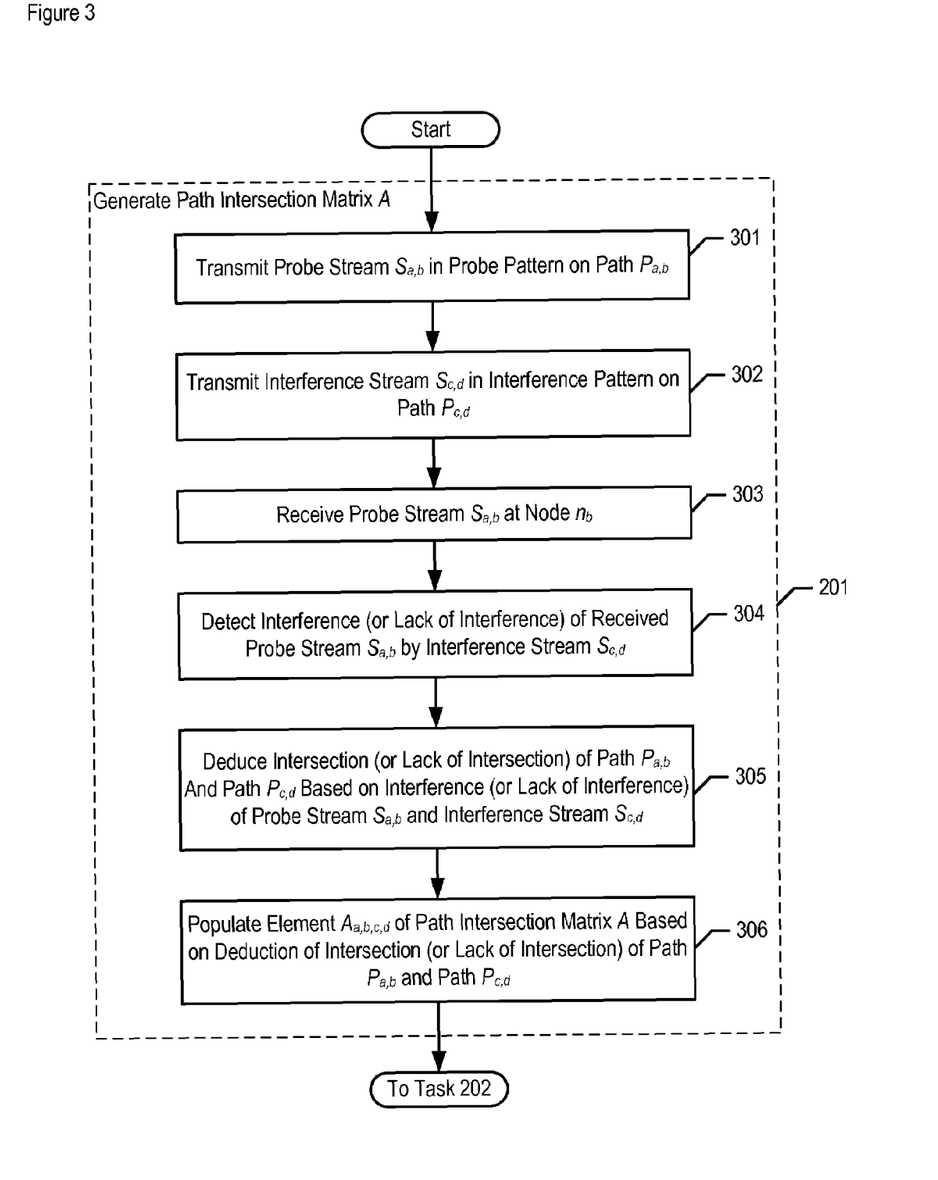
FIG. 3 depicts a flowchart of the salient tasks associated with the operation of task 201.

Generating Path Intersection Matrix A—FIG. 3 depicts a flowchart of the salient tasks associated with the operation of task 201. The execution of tasks 301 through 306 generates the empirical data for one element in path intersection matrix A, and, therefore, tasks 301 through 306 are performed for each pair of paths in P.

Figure 9:
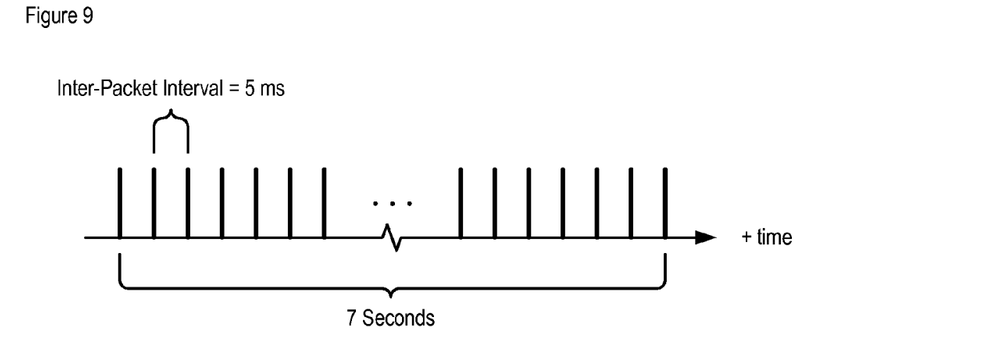
FIG. 9 depicts a diagram of the probe pattern, which comprises 7 seconds of small packets with spacing of 5 ms.

In task 301, the illustrative embodiment transmits a stream of probe packets $s_{a,b}$ in a probe pattern on path $p_{a,b}$. FIG. 9 depicts a diagram of the probe pattern, which comprises one small packet every five milliseconds for a total of seven seconds. It will be clear to those skilled in the art, however, after reading this disclosure, how to make and use alternative embodiments of the present invention in which the probe pattern has any duration, packet size, packet number, and packet spacing.

In task 302, the illustrative embodiment transmits an interference stream of packets $s_{c,d}$ in an interference pattern on path $p_{c,d}$ at the same time that probe stream $s_{a,b}$ is transmitted on path $p_{a,b}$. The salient desirable characteristic of the interference stream $s_{c,d}$ is that if it shares a network-layer node (e.g., queue, processor, etc.) with the probe stream $s_{a,b}$, the interference stream should "interfere" with the probe stream by imparting a temporal pattern of jitter to the probe stream that corresponds to the interference pattern. In accordance with the illustrative embodiment, the interference pattern is characterized by a combination of a scalar k, which represents the number of bursts in the interference pattern, and a vector of k−1 inter-burst intervals.

Figure 10A:
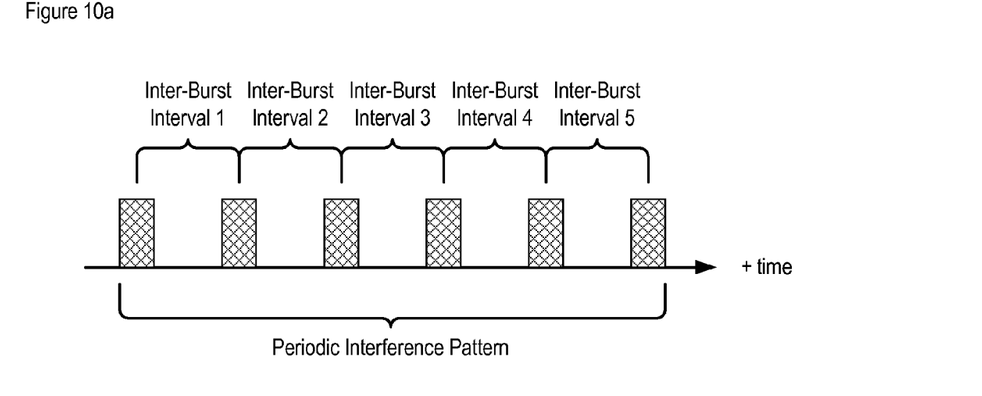
FIG. 10a depicts a diagram of periodic interference pattern.
Figure 10B:
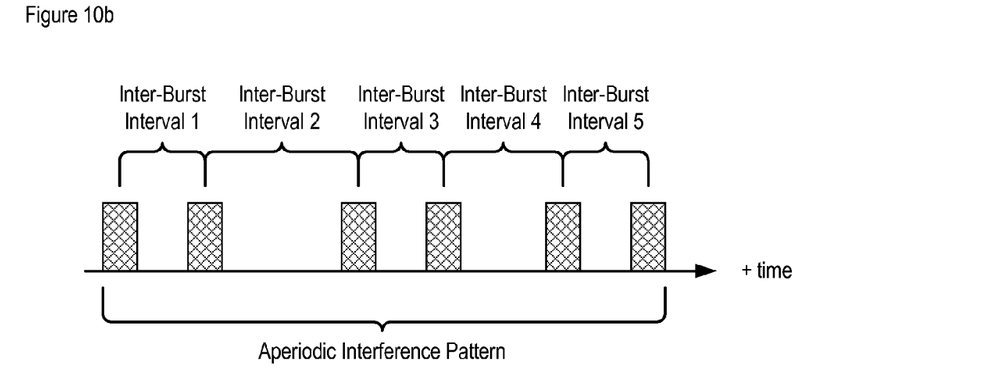
FIG. 10b depicts a diagram of aperiodic interference pattern.

FIG. 10a depicts a diagram of the interference pattern, which comprises 6 bursts of 1500-byte packets transmitted back-to-back at a one second inter-burst interval. It will be clear to those skilled in the art, however, after reading this disclosure, how to make and use alternative embodiments of the present invention in which the interference pattern comprises any number of bursts of any length at any inter-burst interval, whether periodic as in FIG. 10a or aperiodic as depicted in FIG. 10b. Aperiodic interference patterns are advantageous over periodic interference patterns because they can be more easily distinguished from noise than periodic patterns.

In task 303, the illustrative embodiment receives the probe stream $s_{a,b}$ at node $n_b$ in well-known fashion, and records for each packet i its arrival time $tr_i$.

In task 304, the illustrative embodiment detects the interference (or lack of interference) of the probe stream $s_{a,b}$ as received at node $n_b$ by the interference stream $s_{c,d}$. This is described in detail below and in the accompanying figures.

In task 305, the illustrative embodiment deduces that paths $p_{a,b}$ and $p_{c,d}$ intersect when and only when the illustrative embodiment detects, in task 304, interference of the probe stream $s_{a,b}$ by the interference stream $s_{c,d}$.

In task 306, the illustrative embodiment populates element $A_{a,b,c,d}$ of path intersection matrix A with a 1 when the illustrative embodiment deduces that paths $p_{a,b}$ and $p_{c,d}$ intersect in task 305 and with a 0 when the illustrative embodiment deduces that paths $p_{a,b}$ and $p_{c,d}$ do not intersect.

Although the illustrative embodiment empirically tests two pairs of end-to-end paths at a time, it will be clear to those skilled in the art, after reading this disclosure, how to empirically test a plurality of pairs of end-to-end paths using multiple probe streams and a single interference stream. Furthermore, it will be clear to those skilled in the art, after reading, this disclosure, how to empirically test a plurality of end-to-end paths using one or more probe streams and multiple, distinguishable interference streams.

Figure 4:
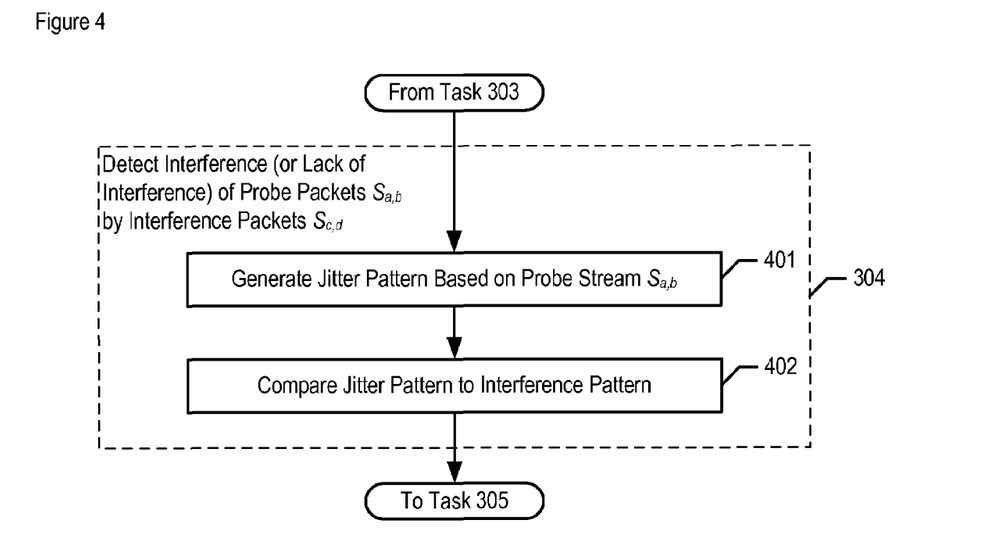
FIG. 4 depicts a flowchart of the salient tasks associated with the operation of task 304.

Detect Interference of Probe Stream $s_{a,b}$ by Interference Stream $s_{c,d}$—FIG. 4 depicts a flowchart of the salient tasks associated with the operation of task 304.

In task 401, the illustrative embodiment generates jitter pattern $J_{a,b,c,d}$ based on probe stream $s_{a,b}$ and interference stream $s_{c,d}$. Jitter pattern $J_{a,b,c,d}$ is a combination of a scalar m, which represents the number of groups found and a vector of m−1 inter-group intervals. This is described in detail below and in the accompanying figure.

Figure 6:
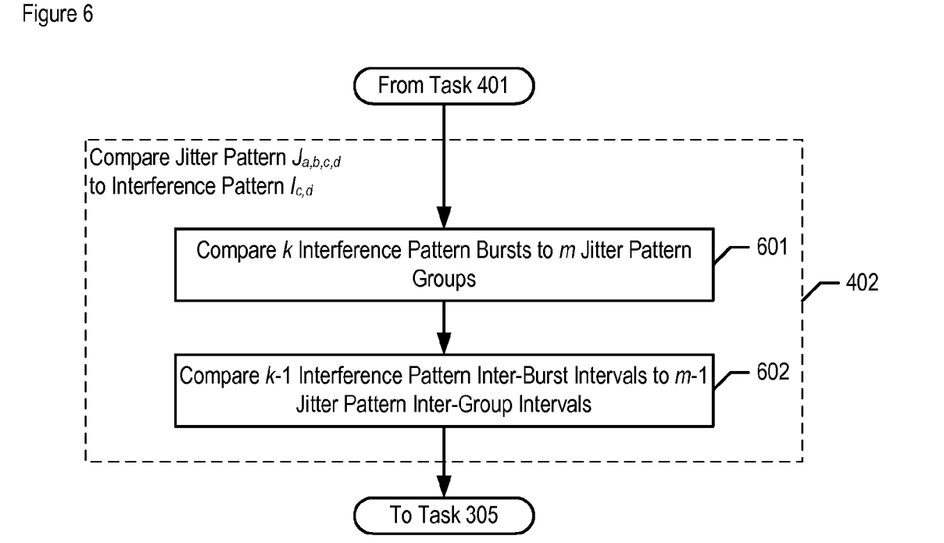
FIG. 6 depicts a flowchart of the salient tasks associated with the operation of task 402.

In task 402, the illustrative embodiment compares jitter pattern $J_{a,b,c,d}$ to the interference pattern. In accordance with the illustrative embodiment, the interference pattern is deemed to be detected when either: (1) $m \in \{k-\Delta, \ldots, k, \ldots, k+\Delta\}$, wherein $\Delta$ is an integer, or (2) at least $k-\psi$ of the k−1 inter-burst intervals temporally correspond to k−ψ of the m−1 inter-group intervals, wherein ψ is a positive integer. In accordance with the illustrative embodiment, Δ=1 and ψ=3, but it will be clear to those skilled in the art, after reading, this disclosure, how to make and use alternative embodiments of the present invention that have any value of Δ (e.g., Δ=0, 1, 2, 3, 4, 5, 10, etc.) and any value of ψ (e.g., ψ=1, 2, 3, 4, 5, 10, etc.). Task 402 is described in detail below and in the accompanying figure. It will be clear to those skilled in the art, however, after reading this disclosure, how to make and use alternative embodiments of the present invention that use another test for detecting interference of the probe stream by the interference stream.

Figure 5:
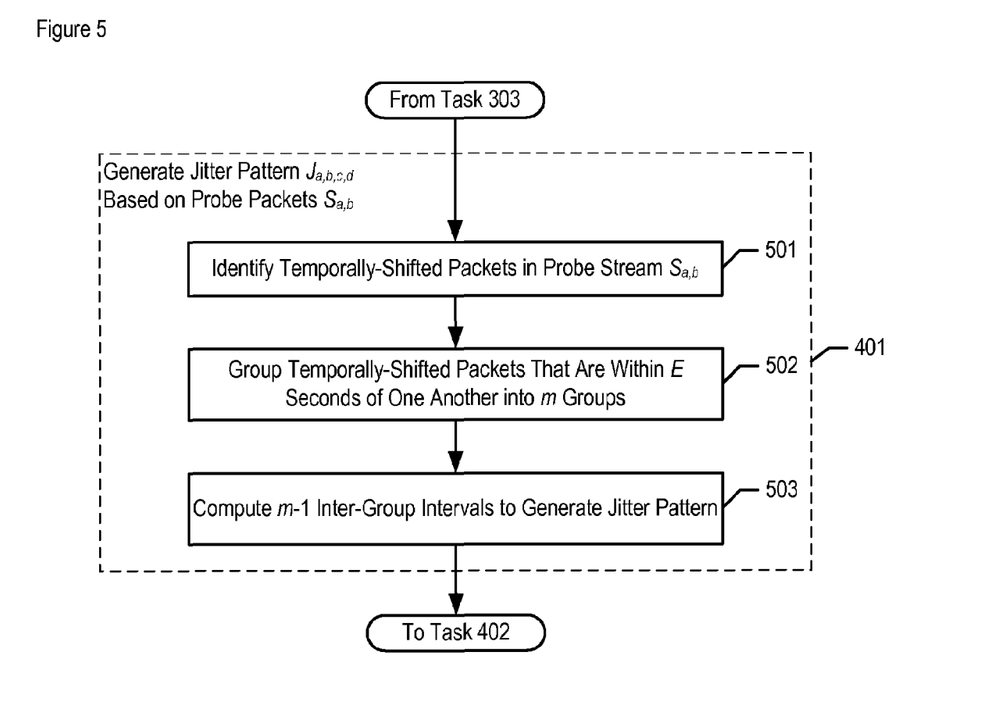
FIG. 5 depicts a flowchart of the salient tasks associated with the operation of task 401.

Generate Jitter Pattern $J_{a,b,c,d}$—FIG. 5 depicts a flowchart of the salient tasks associated with the operation of task 401.

Figure 11A:
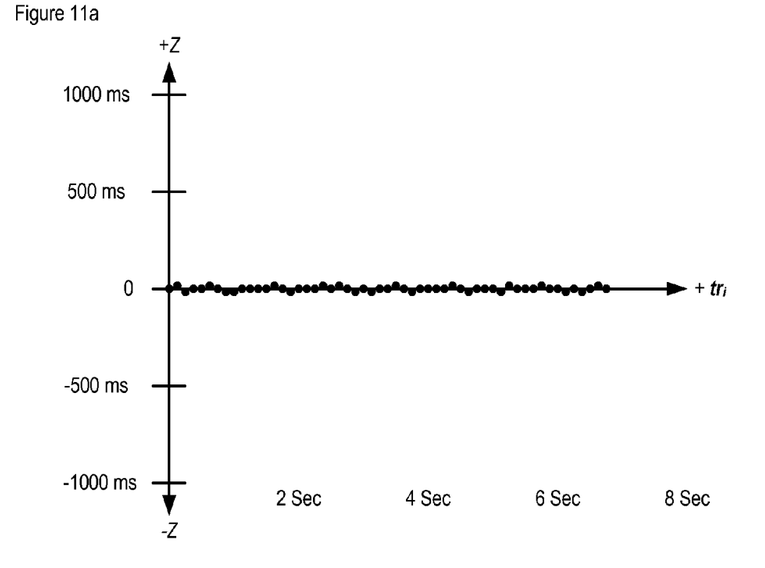
FIG. 11a depicts a plot of $z_i$ versus $tr_i$ without interference by a periodic interference pattern.
Figure 11B:
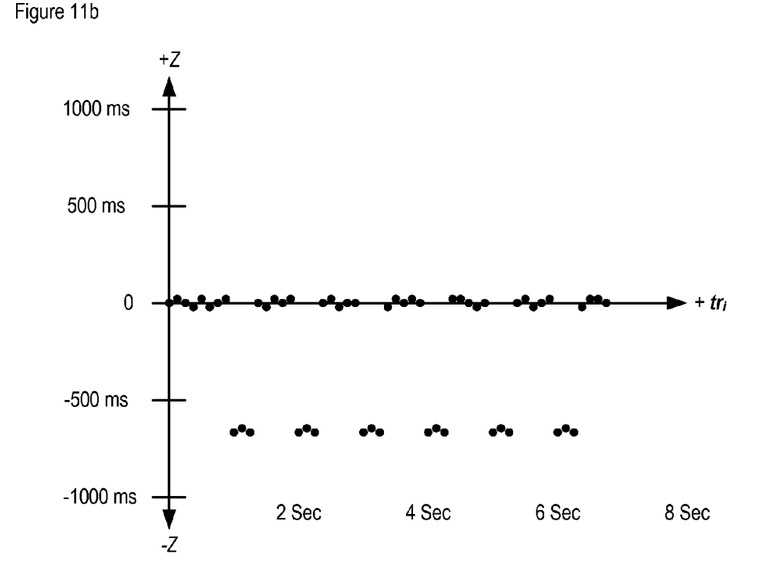
FIG. 11b depicts a plot of $z_i$ versus $tr_i$ with interference by a periodic interference pattern.

In task 501, the illustrative embodiment identifies the temporally-shifted packets in the probe stream $s_{a,b}$ by calculating the temporal shift $z_i$ for each packet i in the probe stream transmitted by node $n_a$ at time $ts_i$ and received node $n_b$ at time $tr_i$:

$$z_i = (tr_i - tr_{(i-1)}) - (ts_i - ts_{(i-1)}) \quad \text{(Eq. 1)}$$

wherein $ts_{(i-1)}$ and $tr_{(i-1)}$ are the sending and receiving times of the i−1$^{th}$ packet, respectively. When there is no interference caused by interference stream $s_{c,d}$, a plot of $z_i$ versus $tr_i$ looks like that depicted in FIG. 11a, but when there is interference, a plot of $z_i$ versus $tr_i$ looks something like that depicted in FIG. 11b. In FIG. 11b, the six groups of temporally-shifted packets, caused by the six periodic bursts in interference stream $s_{c,d}$, respectively, are clearly visible and distinguishable from the unshifted packets. Quantitatively, however, packet i is only considered temporally shifted if it satisfies at least one of Tests 1 though 4 and either Test 5 or Test 6.

Test 1 is satisfied if:

$$z_i < Q_1 - 2D \quad \text{(Test 1)}$$

where $Q_1$ is the first quartile (25$^{th}$ percentile) of Z and D is the difference between the 90$^{th}$ and 10$^{th}$ percentiles of Z.

Test 2 is satisfied if:

$$z_i > Q_3 + 2D \quad \text{(Test 2)}$$

where $Q_3$ is the third quartile (75$^{th}$ percentile) of Z.

Test 3 is satisfied if:

$$z_i < Q_1 - 1.5 IQR \quad \text{(Test 3)}$$

where $IQR = Q_3 - Q_1$.

Test 4 is satisfied if:

$$z_i > Q_3 + 1.5 IQR \quad \text{(Test 4)}$$

Test 5 is satisfied if $z_i$ is less than the 10$^{th}$ percentile of Z, and test 6 is satisfied if $z_i$ is greater than the 90$^{th}$ percentile of Z. It will be clear to those skilled in the art, after reading this disclosure, how to make and use alternative embodiments of the present invention that use other tests and combinations of tests for identifying the temporally-shifted packets.

In task 502, the illustrative embodiment groups the temporally-shifted packets that are within E seconds of one another into m groups, wherein E is a real number and m is a positive integer. In accordance with the illustrative embodiment, E=200 ms, but it will be clear to those skilled in the art, after reading this disclosure, how to make and use alternative embodiments of the present invention which use other values of E.

In task 503, the illustrative embodiment computes the m−1 inter-group intervals where the arrival time for each group equals the median arrival time for the packets in that group.

Compare Jitter Pattern $J_{a,b,c,d}$ to Interference Pattern—FIG. 6 depicts a flowchart of the salient tasks associated with the operation of task 402.

In task 601, the illustrative embodiment compares k (i.e., the number of bursts in the interference pattern) to m (i.e., the number of groups in jitter pattern $J_{a,b,c,d}$).

In task 602, the illustrative embodiment compares the k−1 inter-burst intervals to the m−1 inter-group intervals computed in task 401 to determine if at least k−3 inter-burst intervals temporally correspond to k−3 inter-group intervals.

Figure 7:
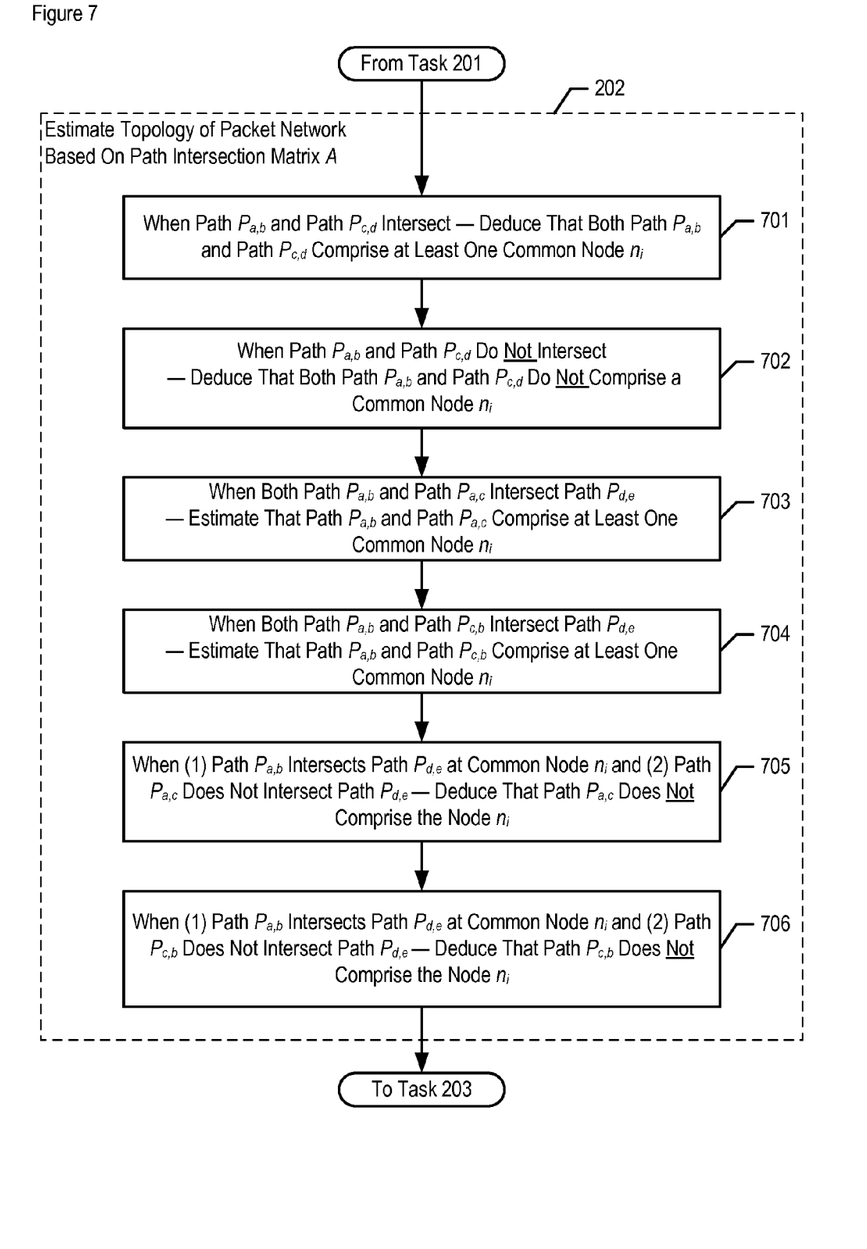
FIG. 7 depicts a flowchart of the salient tasks associated with the operation of task 202.

Estimate Topology of Packet Network 101 Based on Path Intersection Matrix A—FIG. 7 depicts a flowchart of the salient tasks associated with the operation of task 202. The illustrative embodiment employs four deductions, two suppositions, and a rule of thumb to estimate the network-layer topology of packet network 101 based on path intersection matrix A. By considering all of these as simultaneous truths, an estimate of the topology of packet network 101 can be made using the data in path intersection matrix A. If the application of a deduction and a supposition creates an irreconcilable conflict, the deduction overrules the supposition. Absent evidence to the contrary, a supposition is considered correct.

In task 701, when path $p_{a,b}$ and path $p_{c,d}$ intersect, the illustrative embodiment deduces the existence of at least one common node $n_i$ that is in both path $p_{a,b}$ and path $p_{c,d}$. The existence of the node might or might not have been made previously through the application of the deductions and suppositions.

In task 702, when path $p_{a,b}$ and path $p_{c,d}$ do not intersect, the illustrative embodiment deduces that path $p_{a,b}$ and path $p_{c,d}$ do not share a common node. The existence of the node might or might not have been made previously through the application of the deductions and suppositions.

In task 703, when both path $p_{a,b}$ and path $p_{a,c}$ intersect path $p_{d,e}$, the illustrative embodiment supposes the existence of at least one common node $n_i$ (in addition to node $n_a$) that is in both path $p_{a,b}$ and path $p_{a,c}$. Here too, the existence of the node might or might not have been made previously through the application of the deductions and suppositions.

In task 704, when both path $p_{a,b}$ and path $p_{c,b}$ intersect path $p_{d,e}$, the illustrative embodiment supposes the existence of at least one common node $n_i$ (in addition to node $n_b$) that is in both path $p_{a,b}$ and path $p_{c,b}$. Here too, the existence of the node might or might not have been made previously through the application of the deductions and suppositions to other data.

In task 705, when (1) path $p_{a,b}$ and path $p_{d,e}$ intersect at a common node $n_i$, and (2) path $p_{a,c}$ does not intersect path $p_{d,e}$, the illustrative embodiment deduces that path $p_{a,c}$ does not comprise node $n_i$. This deduction is useful to rebut a supposition made in either task 703 or 704.

In task 706, when (1) path $p_{a,b}$ and path $p_{d,e}$ intersect at a common node $n_i$, and (2) path $p_{c,b}$ does not intersect path $p_{d,e}$, the illustrative embodiment deduces that path $p_{c,b}$ does not comprise node $n_i$. This deduction is useful to rebut a supposition made in either task 703 or 704.

Additionally, a rule of thumb applies when two paths originate or terminate at a single node. The larger the number of paths that both paths intersect (and fail to intersect), the longer the segment (i.e., edges and nodes) shared by the two paths. This can be determined by assessing the similarity between the two column vectors in the path intersection matrix that correspond to the two paths. In other words, if two paths originate or terminate at a single node, a low Hamming distance between the two column vectors for those paths suggests a long shared segment between the paths.

It will be clear to those skilled in the art, after reading this disclosure, how to estimate the topology of any network based on these deductions, suppositions, and the rule of thumb.

Utilize Deduced Topology of Packet Network 101 to Route Packets—FIG. 8 depicts a flowchart of the salient tasks associated with the operation of task 203.

In task 801, the illustrative embodiment transmits a packet or stream of packets to:

(a) transit a first node $n_1$ and not transit a second node $n_2$ in some circumstances (e.g., when the jitter pattern corresponds to the temporal pattern, etc.); and (b) transit the second node $n_2$ and not transit the first node $n_1$ in some other circumstances (e.g., when the jitter pattern fails to correspond to the temporal pattern, etc.).

In task 802, the illustrative embodiment transmits a packet or stream of packets to:

(a) transit both a first node $n_1$ and a second node $n_2$ in some circumstances (e.g., when the jitter pattern corresponds to the temporal pattern, etc.); and (b) transit neither second node $n_2$ nor the first node $n_1$ in some other circumstances (e.g., when the jitter pattern fails to correspond to the temporal pattern, etc.).

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:

transmitting a first stream of packets in a packet network, wherein:
  i. the first stream of packets is transmitted from a first node $n_1$ to a second node $n_2$ via a first path $p_{1,2}$ in the packet network,
  ii. the first stream comprises a first packet and a second packet, and
  iii. the transmission of the first stream comprises a first temporal interval between the transmissions of the first packet and the second packet;

detecting interference by a first stream of packets on a second stream of packets in a packet network, wherein:
  i. the second stream of packets is transmitted from a third node $n_3$ to a fourth node $n_4$ via a second path $p_{3,4}$ in the packet network,
  ii. the second stream is transmitted concurrently with the first stream;
  iii. the second stream comprises a third packet and a fourth packet, and
  iv. the interference is detected when the first temporal interval corresponds to the temporal interval between the receptions of the third packet and the fourth packet at the fourth node $n_4$;

detecting interference by the first stream of packets on a third stream of packets in the packet network wherein:
  i. the third stream of packets is transmitted from the third node $n_3$ to a fifth node $n_5$ via a third path $p_{3,5}$ in the packet network, and
  ii. the third stream is transmitted concurrently with the first stream and the second stream;
  iii. the third stream comprises a fifth packet and a sixth packet, and
  iv. the interference is detected when the first temporal interval corresponds to the temporal interval between the receptions of the fifth packet and the sixth packet at the fifth node $n_5$;

deducing that both the second path $p_{3,4}$ and the third path $p_{3,5}$ comprise a sixth node $n_6$ because both the second stream of packets and the third stream of packets are interfered by the first stream of packets; and transmitting a packet to transit the sixth node $n_6$.

2. The method of claim 1 further comprising:

detecting no interference by the first stream of packets on a fourth stream of packets in the packet network wherein the fourth stream of packets is transmitted from the third node $n_3$ to a seventh node $n_7$ via a fourth path $p_{3,7}$ in the packet network;

deducing that the fourth path $p_{3,7}$ comprises an eighth node $n_8$ that is not in the second path $p_{3,4}$ or the third path $p_{3,5}$ because the fourth stream of packets is not interfered by the first stream of packets; and transmitting a second packet to transit the eighth node $n_8$.

3. A method comprising:

transmitting a first stream of packets in a packet network, wherein:
  i. the first stream of packets is transmitted from a first node $n_1$ to a second node $n_2$ via a first path $p_{1,2}$ in the packet network,
  ii. the first stream comprises a first packet and a second packet, and
  iii. the transmission of the first stream comprises a first temporal interval between the transmissions of the first packet and the second packet;

detecting interference by a first stream of packets on a second stream of packets in a packet network, wherein:
  i. the second stream of packets is transmitted from a third node $n_3$ to a fourth node $n_4$ via a second path $p_{3,4}$ in the packet network,
  ii. the second stream is transmitted concurrently with the first stream;
  iii. the second stream comprises a third packet and a fourth packet, and
  iv. the interference is detected when the first temporal interval corresponds to the temporal interval between the receptions of the third packet and the fourth packet at the fourth node $n_4$;

detecting interference by the first stream of packets on a third stream of packets in the packet network, wherein:
  i. the third stream of packets is transmitted from a fifth node $n_5$ to the fourth node $n_4$ via a third path $p_{5,4}$ in the packet network,
  ii. the third stream is transmitted concurrently with the first stream and the second stream;
  iii. the third stream comprises a fifth packet and a sixth packet,
  iv. the interference is detected when the first temporal interval corresponds to a temporal interval between the receptions of the fifth packet and the sixth packet at the fourth node $n_4$;

deducing that both the second path $p_{3,4}$ and the third path $p_{5,4}$ comprise a sixth node $n_6$ because both the second stream of packets and the third stream of packets are interfered by the first stream of packets; and transmitting a first packet to transit the sixth node $n_6$.

4. The method of claim 3 further comprising:

detecting no interference by the first stream of packets on a fourth stream of packets in the packet network, wherein the fourth stream of packets is transmitted from a seventh node $n_7$ to the fourth node $n_4$ via a fourth path $p_{7,4}$ in the packet network;

deducing that the fourth path $p_{7,4}$ comprises a eighth node $n_8$ that is not in the second path $p_{3,4}$ or the third path $p_{5,4}$ because the fourth stream of packets is not interfered by the first stream of packets; and transmitting a second packet to transit the eighth node $n_8$.

5. A method comprising:

transmitting a first stream of packets in a packet network, wherein:
  i. the first stream of packets is transmitted from a first node $n_1$ to a second node $n_2$ via a first path $p_{1,2}$ in the packet network,
  ii. the first stream comprises a first packet and a second packet, and
  iii. the transmission of the first stream comprises a first temporal interval between the transmissions of the first packet and the second packet;

detecting interference by a first stream of packets on a second stream of packets in a packet network, wherein:
  i. the second stream of packets is transmitted from a third node $n_3$ to a fourth node $n_4$ via a second path $p_{3,4}$ in the packet network,
  ii. the second stream is transmitted concurrently with the first stream;
  iii. the second stream comprises a third packet and a fourth packet, and
  iv. the interference is detected when the first temporal interval corresponds to the temporal interval between the receptions of the third packet and the fourth packet at the fourth node $n_4$;

detecting no interference by the first stream of packets on a third stream of packets in the packet network, wherein:
  i. the third stream of packets is transmitted from the third node $n_3$ to a fifth node $n_5$ via a third path $p_{3,5}$ in the packet network;
  ii. the third stream is transmitted concurrently with the first stream and the second stream;
  iii. the third stream comprises a fifth packet and a sixth packet, and
  iv. the interference is detected when the first temporal interval corresponds to the temporal interval between the receptions of the fifth packet and the sixth packet at the fifth node $n_5$;

deducing that the second path $p_{3,4}$ comprises a sixth node $n_6$ and that the third path $p_{3,5}$ does not comprise the sixth node $n_6$ because the second stream of packets is interfered by the first stream of packets but the third stream of packets is not interfered by the first stream of packets; and transmitting a first packet to transit the sixth node $n_6$.

6. A method comprising:

transmitting a first stream of packets in a packet network, wherein:
  i. the first stream of packets is transmitted from a first node $n_1$ to a second node $n_2$ via a first path $p_{1,2}$ in the packet network,
  ii. the first stream comprises a first packet and a second packet, and
  iii. the transmission of the first stream comprises a first temporal interval between the transmissions of the first packet and the second packet;

detecting interference by a first stream of packets on a second stream of packets in a packet network, wherein:
  i. the second stream of packets is transmitted from a third node $n_3$ to a fourth node $n_4$ via a second path $p_{3,4}$ in the packet network,
  ii. the second stream is transmitted concurrently with the first stream;
  iii. the second stream comprises a third packet and a fourth packet, and
  iv. the interference is detected when the first temporal interval corresponds to the temporal interval between the receptions of the third packet and the fourth packet at the fourth node $n_4$;

detecting no interference by the first stream of packets on a third stream of packets in the packet network, wherein:
  i. the third stream of packets is transmitted from a fifth node $n_5$ to the fourth node $n_4$ via a third path $p_{5,4}$ in the packet network,
  ii. the third stream is transmitted concurrently with the first stream and the second stream;
  iii. the third stream comprises a fifth packet and a sixth packet,
  iv. the interference is detected when the first temporal interval corresponds to the temporal interval between the receptions of the fifth packet and the sixth packet at the fourth node $n_4$;

deducing that the second path $p_{3,4}$ comprises a sixth node $n_6$ and that the third path $p_{5,4}$ does not comprise sixth node $n_6$ because the second stream of packets is interfered by the first stream of packets but the third stream of packets is not interfered by the first stream of packets; and transmitting a first packet to transit the sixth node $n_6$.

* * * * *